United States Patent [19]

Nagai

[11] Patent Number: 5,706,332
[45] Date of Patent: Jan. 6, 1998

[54] APPARATUS FOR UNFOLDING AND ACTIVATING A PORTABLE TELEPHONE

[75] Inventor: Michio Nagai, Tokyo, Japan

[73] Assignee: NEC Corporation, Tokyo, Japan

[21] Appl. No.: 532,364

[22] Filed: Sep. 22, 1995

[30] Foreign Application Priority Data

Sep. 22, 1994  [JP]  Japan .................. 6-254493

[51] Int. Cl.⁶ .................................................. H04Q 7/32
[52] U.S. Cl. .................. 379/58; 379/433; 455/89; 455/90; 455/97; 455/351
[58] Field of Search ........................ 455/33.1, 89, 90, 455/97, 128, 351; 379/58, 61, 428, 429, 434, 433; D14/138, 147, 248, 249, 250

[56] References Cited

U.S. PATENT DOCUMENTS

| 5,493,690 | 2/1996 | Shimazaki | 379/58 |
| 5,504,813 | 4/1996 | Takasaki | 379/433 |
| 5,555,449 | 9/1996 | Kim | 455/89 |

FOREIGN PATENT DOCUMENTS

| 59-135960 | 8/1984 | Japan | 379/428 |
| 86929 | 4/1988 | Japan | |
| 307841 | 10/1992 | Japan | |

*Primary Examiner*—Dwayne Bost
*Assistant Examiner*—Myron K. Wyche
*Attorney, Agent, or Firm*—Scully, Scott, Murphy & Presser

[57] ABSTRACT

A portable telephone with a fundamental structure consisting of a first housing with a built-in receiver and a second housing with a built-in transmitter which are connected around a hinge section in a rotatable manner, which further has biasing means for biasing the first housing and the second housing for their unfolding, attaching means for attaching the first housing and the second housing and detaching means for detaching the attached housings. An antenna is attached to the second housing in a rotatable manner.

The first housing and the second housing are folded when the telephone is not in use. For reception or transmission, the attached first housing and second housing and the attached antenna are detached to unfold the telephone to set a usable state by a one-touch operation with a slide button.

16 Claims, 4 Drawing Sheets

FIG.2(a)
FIG.2(b)
FIG.2(c)
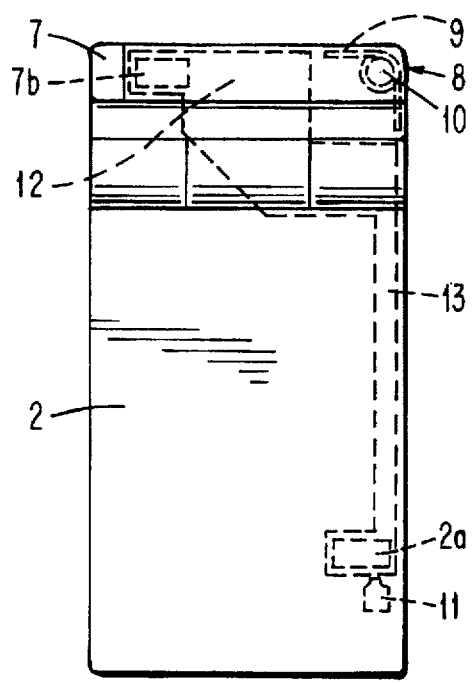
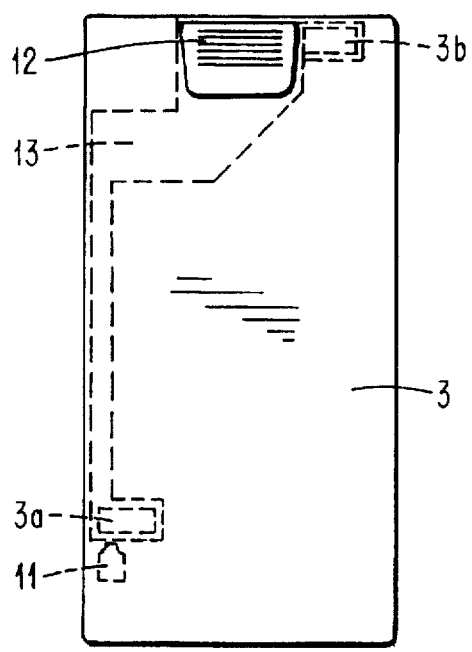
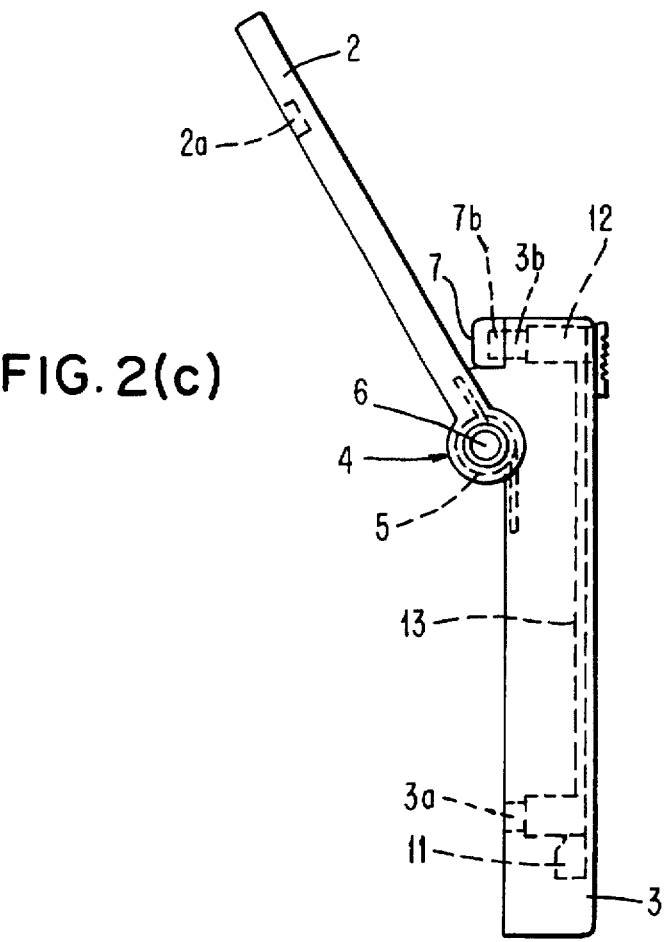

though the present invention may be applied to a

APPARATUS FOR UNFOLDING AND ACTIVATING A PORTABLE TELEPHONE

BACKGROUND OF THE INVENTION

1. Field of the Invention

The present invention relates to a portable radio, and particularly to a folding portable telephone.

2. Description of the Prior Art

Of portable telephones, folding portable telephones are widely used for their portability standing out from the crowd. Folding portable telephones are usually constructed with a housing with a built-in receiver and a housing with a built-in transmitter linked by a hinge section in a rotatable manner. The user unfolds the two housings of the folding portable telephone before use and folds them onto each other again after use.

A folding portable telephone of the prior art is shown in FIG. 5. This portable telephone is composed of an upper housing 21 which contains a receiver section 22, a display section 23, etc., a lower housing 24 which contains a transmitter section 25, an operation key panel 26, etc. and a hinge section 27 connecting the two housings in a rotatable manner.

Before use, the upper housing 21 and the lower housing 24 are folded onto each other, and upon use the two housings 21 and 24 are unfolded around the hinge section 27 and an antenna 28 stored in the upper housing 21 is extended.

Folding portable telephones have the advantage of being compact. The user, however, has the inconvenience of unfolding the upper housing 21 with one hand while holding the lower housing 24 with the other hand. It is very troublesome to have to use both hands every time the portable telephone is activated while, for example, walking with a bag in one hand.

Therefore, folding portable telephones designed to solve such inconvenience have been suggested. For example, the official gazette of Japanese Patent Laid-Open No. 307841/1992 discloses a portable telephone which is constructed in such a manner that a body containing a transmitter, etc. and a cover containing a receiver are connected in a rotatable manner. This portable telephone allows unfolding of the cover by a one-touch operation, but does not allow activation of the telephone and extending of the antenna.

The official gazette of Japanese Patent Laid-Open No. 86929/1988 discloses a folding radio comprising a body with a built-in receiver; a collapsible frame attached to the body; a frame-contained transmitter; biasing means for unfolding the frame; engaging means composed of engaging hooks; and disengaging means. This radio allows disengagement of the frame to coincide with activation of the radio by pressing a start button. This radio, however, has problems in that the engaging hook for engaging the frame are easy to break, and the antenna is uncontrollable because it is the frame itself.

SUMMARY OF THE INVENTION

It is an object of the present invention to provide a folding portable telephone which allows activation and unfolding of the telephone and extending of the antenna at the same instant by a one-touch operation, and thus is easily activated for use.

In order to accomplish this object, the portable telephone according to the present invention comprises:

a first housing with at least a built-in receiver;

a second housing which contains, at least, a transmitter, an antenna anchored so as to be rotatable around an antenna hinge section, antenna-biasing means for biasing the antenna for extension thereof, antenna-attaching means for attaching the antenna and antenna-detaching means for detaching the attached antenna;

a hinge section for connecting the first housing and the second housing in a rotatable manner;

biasing means for biasing the first housing and the second housing for unfolding thereof;

attaching means for attaching the first housing and the second housing;

detaching means for detaching the attached first housing and second housing; and a hook-switch.

The first housing, the second housing and the antenna of this portable telephone are folded by the attaching means and the antenna-attaching means when not in use. At the start of use, the user may manipulate the detaching means, the antenna-detaching means and the hook-switch in an interlocked manner by operation only with a slide button, and thus may start the hook-switch, unfold the housings and extend the antenna of the telephone at the same instant with one hand.

BRIEF DESCRIPTION OF THE DRAWINGS

The above and other objects, features and advantages of the present invention will become apparent from the following detailed description when taken with the accompanying drawings, in which:

FIG. 1 is a perspective view of an embodiment of the portable telephone according to the present invention, wherein

FIG. 2 is a schematic view of the embodiment of the telephone according to the present invention, wherein FIG. 2(a) is a plan view of the folded telephone, FIG. 2(b) is a rear view of the folded telephone, and FIG. 2(c) is a side view of the unfolded telephone;

FIG. 3 is an external view of a connecting member, wherein

DETAILED DESCRIPTION OF THE PREFERRED EMBODIMENTS

Although the present invention may be applied to a variety of folding portable radios, for convenience in explanation only, the present invention will now be explained based on one embodiment thereof with reference to the drawings.

Figure 1A:
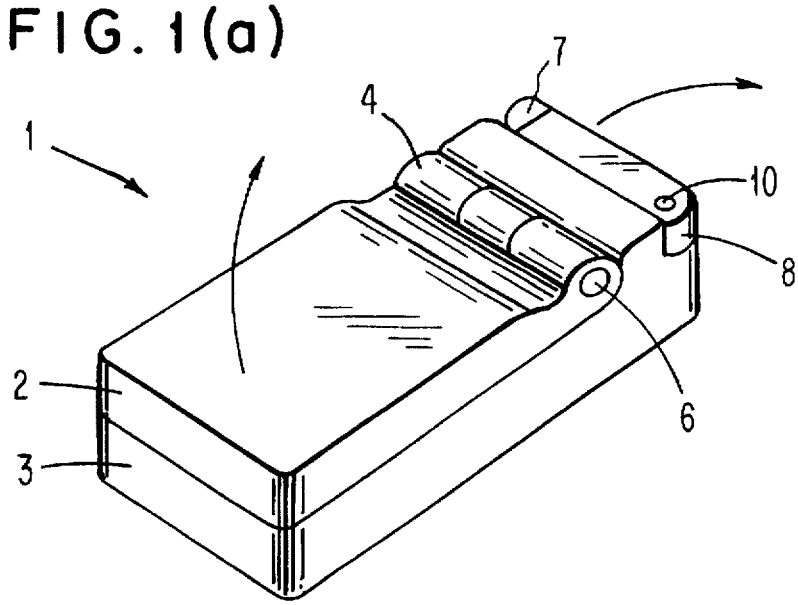
FIG. 1(a) is a perspective view of the telephone in the folded state.
Figure 1B:
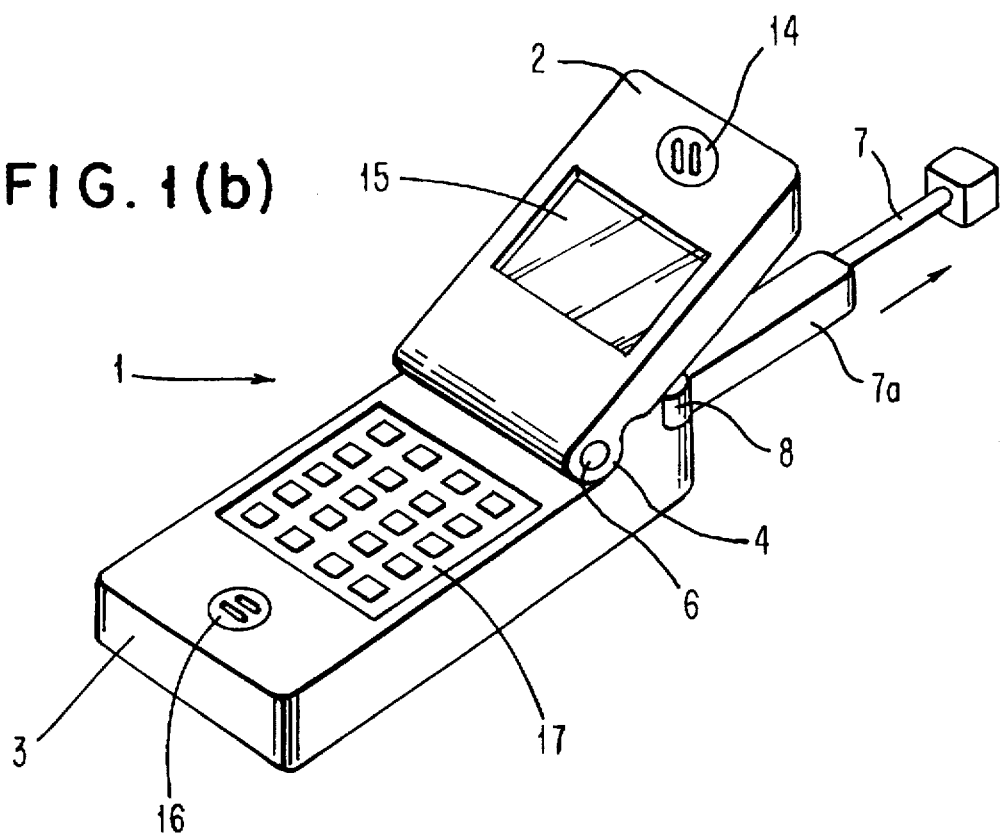
FIG. 1(b) is a perspective view of the telephone in the unfolded state.

An embodiment of the portable telephone according to the present invention will now be explained. As shown in FIG. 1(b), the folding portable telephone 1 is basically provided with a first housing 2 which contains a receiver 14, a display section 15, etc.; a second housing 3 which contains a transmitter 16, an operation key pad 17, etc.; and a hinge section 4 which connects the first housing 2 and the second housing 3 in a rotatable manner.

The shaft 6 composing the hinge section 4 is provided with a coiled spring 5, as shown in FIG. 2(c). The biasing force of this coiled spring 5 allows unfolding of the first housing 2 and the second housing 3 to a given angle around the shaft 6. The angle of unfolding may be set by providing a given notch or an appropriate stopper in the vicinity of the hinge section 4 for the first housing 2 and the second housing 3.

As shown in FIGS. 2(a) through 2(c), the first housing 2 is provided with a magnet 2a, and the second housing 3 is provided with another magnet 3a. These two magnets 2a, 3a are placed so that they face each other when the first housing and the second housing are folded. When the telephone is folded around the hinge section 4, the magnets 2a, 3a are attracted to each other against the biasing force of the coiled spring 5 to fold the telephone. As shown in FIG. 2(c), the magnets 2a, 3a preferably are placed at maximum distances from the hinge section 4.

Figure 3A:
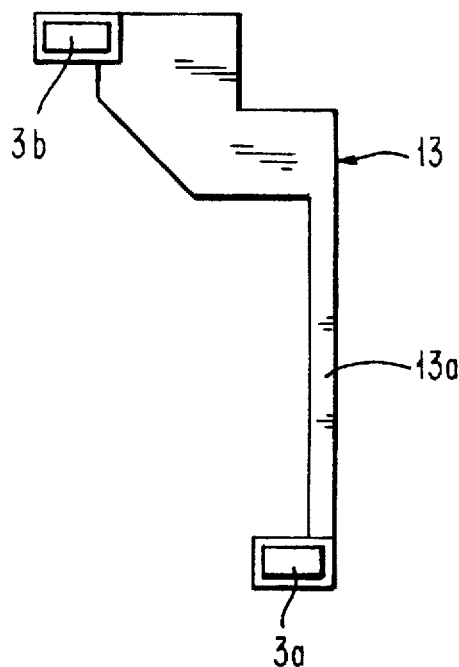
FIG. 3(a) is a plan view.
Figure 3B:
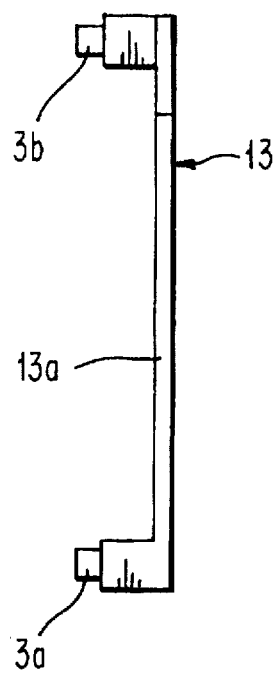
FIG. 3(b) is a side view.

A slidable connecting member 13 is placed in the second housing 3. The configuration of the connecting member 13 is shown in FIGS. 3(a) and 3(b). A protrusion section is formed at each end of one surface of the connecting member 13, and the magnet 3a and another magnet 3b are placed on these protrusion sections. A slide button 12 is formed on the other surface of the connecting member, as shown in FIG. 2(b). The connecting member 13 and the magnets 3a, 3b placed thereon may be moved by sliding this slide button 12.

In the present embodiment, the connecting member 13 is moved along the longer direction of the second housing 3. In order to slide the connecting member 13 smoothly along a fixed direction, the bar section 13a of the connecting member 13 is retained inside the second housing 3 to guide the sliding movement. More specifically, part or most of the bar section 13a is retained in a cylindrical member or a plurality of ring members to ensure retainment of the connecting member 13 and the smooth sliding movement.

An antenna storage section 7a is placed, in a rotatable manner, at the upper end of the second housing 3, i.e., at the side on which the hinge section 4 is formed, via the antenna hinge section 8. The location of the antenna storage section 7a is not limited to the upper end of the second housing 3, and it may be located at the lower end or side of the second housing 3 as long as it does not impede operation of the telephone. The antenna 7 is stored in the antenna storage section 7a in an extendable manner. The antenna 7 may be extended manually as desired while using the telephone.

The antenna hinge section 8 is provided with a coiled spring 9. The biasing force of this coiled spring 9 serves to unfold the antenna storage section 7a and the second housing 3 to a given angle around the shaft 10. In order to fix the angle of unfolding, a stopper is formed on either the antenna storage section 7a or the second housing 3.

An antenna magnet 7b is placed in the antenna storage section 7a, and the magnet 3b is placed on the connecting member 13 in the second housing 3. These two magnets 3b, 7b are placed at such positions that they face each other when the antenna 7 and the second housing 3 are folded. When the user folds the antenna storage section 7a around the antenna hinge section 8, the magnets 3b, 7b are attracted to each other against the biasing force of the coiled spring 9 to attach the antenna. As shown in FIG. 2, the magnets 3b, 7b preferably are placed at maximum distances from the antenna hinge section 7.

A hook-switch 11 is placed in the second housing 3. This hook-switch 11 is placed at such a position as allow it to be pressed by the connecting member 13 while sliding. As long as this pressing is ensured, the hook-switch 11 may be located at any appropriate position near the connecting member 13 in the second housing 3. In the embodiment shown in FIG. 2, the hook-switch 11 is placed near the side of the connecting member 13 opposite to the hinge section 4. The hook-switch 11 may be operated by either of two systems; conversation may start when the hook-switch 11 is in a pressed (off-hook) state, and be disconnected when the hook-switch 11 is restored to the home position (on-hook state), or conversation may start when the hook-switch 11 is in a pressed (off-hook) state, and be disconnected when the hook-switch 11 is pressed (on-hook state) again.

The slide button 12 is placed at the upper end on the underside of the second housing 3. Since this button 12 is connected to the connecting member 13, sliding of the button 12 results in movement of the magnets 3a, 3b and concurrent pressing of a start switch 11 placed near the connecting member 13.

In the explanation given above, the attachment between the first housing 2 and the second housing 3 and the attachment between the antenna 7 and the second housing 3 were accomplished by mutual attraction of magnets with north and south poles. The attaching, however, may also be ensured by replacing either of the two magnets by a metal such as iron which is attracted by the other magnet.

Operation and function of the portable telephone according to the present invention will now be explained.

The power switch (not shown) for the telephone is usually maintained in the ON state to allow standby for reception at all times. When not in use, however, the first housing 2 and the second housing 3 of the telephone are folded around the hinge section 4 and attached with each other. The first housing 2 and the second housing 3 are attached with each other by the attraction between the magnets 2a, 3a. The antenna 7 is also folded onto the second housing 3 around the antenna hinge section 8, and they are attached with each other by the attraction between the magnets 3b, 7b.

When reception or transmission is started, first the telephone 1 is held in either hand, and the slide button 12 is slid with a finger along the lower end of the second housing 3. Here, since the connecting member 13 is connected to the slide button 12, the magnet 3a is moved in an interlocked manner away from the point of contact with the magnet 2a where it is held by attraction. As a result, the attraction between the magnet 3a and the magnet 2a becomes weaker than the biasing force of the coiled spring 5, and thus the first housing 2 is rotated around the shaft 6 of the hinge section 4 by the biasing force of the coiled spring 5 to unfold the telephone.

Concurrently, the magnet 3b also moves apart from the position of contact with the magnet 7b through attraction. As a result, the attraction between the magnet 3b and the magnet 7b becomes weaker than the biasing force of the coiled spring 9, and thus the antenna 7 is rotated around the shaft 10 of the antenna hinge section 8 by the biasing force of the coiled spring 9 to extend the antenna. During conversation, the antenna may be extended manually as desired.

In addition, sliding of the slide button 12 results in pressing of the hook-switch 11 by the connecting member 13 to put the telephone in the active (off-hook) state. Accordingly, the user may put the telephone in a receivable state simply by a one-hand operation with the slide button 12.

After use of the telephone, the user folds the antenna 7 toward the second housing 3, and then folds the first housing 2 and the second housing 3 onto each other. This results in exertion of magnetic attraction between the magnet 2a and the magnet 3a, and between the magnet 3b and the magnet 7b to bring the respective pairs of the counterparts into closer positions. As a result, these magnets return to their home attached positions, and concurrently the slide button 12 and the connecting member 13 return to their positions before use as well. The user, regardless of the movement of the magnets, may manually return the slide button 12 to its home position and then may fold the telephone and the antenna 7.

With the telephone constructed as described above, sliding of the slide button 12 results in almost concurrent accomplishment of all the operations for unfolding the first housing 2 and the second housing 3, extending the antenna 7 and pressing the switch 11. Therefore, the user may easily perform, with one hand, these operations necessary to start the use of the telephone.

Adjustment for the positional relationship between the connecting member 13 and the hook-switch 11 allows the telephone to be merely unfolded by sliding the slide button 12 some distance, and subsequent pressing of the hook-switch 11 by further sliding of the slide button 12. Here, a stopper (e.g., a protrusion section) which helps the user to feel the stopping position may be formed on the second housing 3. This allows setting of the volume of incoming calls, inputting telephone numbers to memory, etc. even while not in use.

Figure 4:
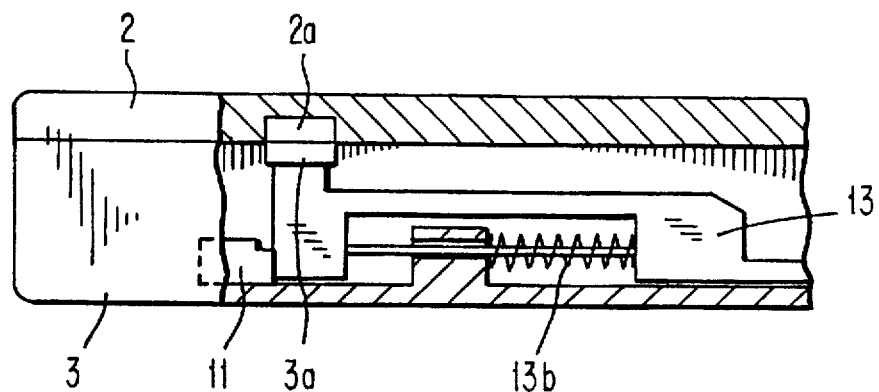
FIG. 4 is a partial sectional view of another embodiment according to the present invention.
Figure 5:
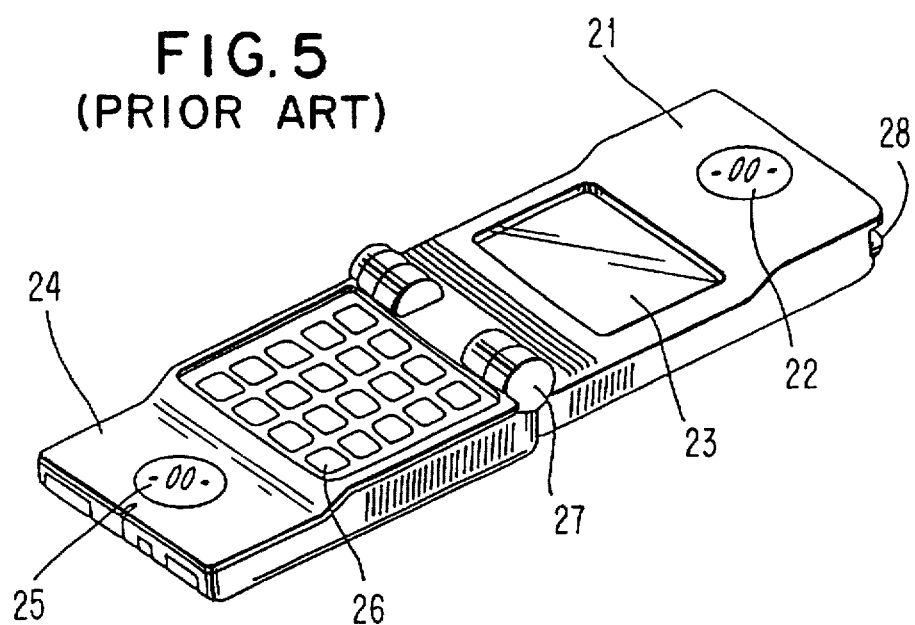
FIG. 5 is a perspective view of a folding portable telephone of the prior art.

Another embodiment of the present invention is shown in FIG. 4. Here, the hook-switch 11 used relies on the system in which the telephone is brought into the active (off-hook) state by first pressing, and then into non-active (on-hook) state by a second pressing. The connecting member 13 is constantly forced to press against the slide button by a spring 13b. Therefore, the slide button 12 is always maintained at the position before use, and thus is easy to operate to turn on and off the hook-switch 11 in a reliable manner. This configuration, as well, allows the slide button to slide to a given position to only unfold the telephone in advance.

While the present invention has been described in connection with certain preferred embodiments, it is to be understood that the subject matter encompassed by the present invention is not limited to those specific embodiments. On the contrary, it is intended to include all alternatives, modifications and equivalents as can be included within the spirit and scope of the following claims.

What is claimed is:

1. An apparatus for unfolding and activating a portable telephone, which comprises:

a first housing having at least a built in receiver;

a second housing having at least a transmitter, an antenna anchored so as to be rotatable around an antenna hinge section, antenna-biasing means for biasing the antenna for extending thereof, antenna-attaching means for attaching the antenna and antenna-detaching means for detaching the attached antenna;

a hinge section for rotatably connecting the first and second housing such that the housings are capable of attaining a folded position;

a biasing means for biasing the first housing and the second housing into an unfolded position;

a first magnet positioned on the first housing;

a second magnet positioned on the second housing, such that one of the poles of the first magnet faces the opposite pole of the second magnet for magnetically attracting one magnet to the other when in the folded position;

a detaching means for detaching the attached first housing and second housing; and a hook switch positioned in the second housing for activating the electronic operation of the telephone.

2. The apparatus as claimed in claim 1, wherein the detaching means is a means for moving the first magnet positioned on the first housing and/or the second magnet positioned on the second housing to increase the spacing between the first magnet and the second magnet.

3. The apparatus as claimed in claim 1, wherein the detaching means and the antenna-detaching means operate in an interlocked manner.

4. The apparatus as claimed in claim 1, wherein the detaching means, the antenna-detaching means and the hook-switch operate in an interlocked manner.

5. The apparatus as claimed in claim 1, wherein the biasing means is a spring placed at the hinge section.

6. The apparatus as claimed in claim 1 or 2, wherein either magnet of the first magnet and second magnet is replaced by a metal which attracts the other magnet.

7. The apparatus as claimed in claim 1, wherein the antenna-attaching means comprises a third magnet positioned on the antenna and a fourth magnet positioned on the second housing, the magnets being positioned such that one of the poles of the third magnet faces the opposite pole of the fourth magnet when the antenna is in its attached position.

8. The apparatus as claimed in claim 1, wherein the antenna-detaching means is a means for moving the third magnet placed on the antenna and/or the fourth magnet positioned on the second housing to increase the spacing between the third magnet and the fourth magnet.

9. The apparatus as claimed in claim 1, wherein the antenna-biasing means is a spring positioned at the antenna hinge section.

10. The apparatus as claimed in claims 7 or 8, wherein either magnet of the third magnet and the fourth magnet is replaced by a metal which attracts the other magnet.

11. The apparatus as claimed in claim 2, wherein the detaching means comprises a connecting member which connects to the second magnet and a slide button positioned on the connecting member.

12. The apparatus as claimed in claim 7, wherein the antenna-detaching means comprises a connecting member which connects to the fourth magnet and a slide button positioned on the connecting member.

13. The apparatus as claimed in claims 3, 11 or 12, wherein the detaching means and the antenna-detaching means comprise the connecting member which connects to the second magnet or the fourth magnet and the slide button positioned on the connecting member.

14. The apparatus as claimed in claim 13, further comprising a switch positioned near the connecting member at a given distance for activating the electronic operation of the telephone when pressed by the connecting number.

15. The apparatus as claimed in claims 11, 12, or 14 wherein the connecting member further comprises a spring for biasing the connecting member and slide button into their home positions.

16. The apparatus as claimed in claim 13, wherein the connecting member further comprises a spring for biasing the connecting member and slide button into their home positions.

* * * * *